April 2, 1929. J. S. WHITE 1,707,888
VENTILATOR
Filed April 30, 1928
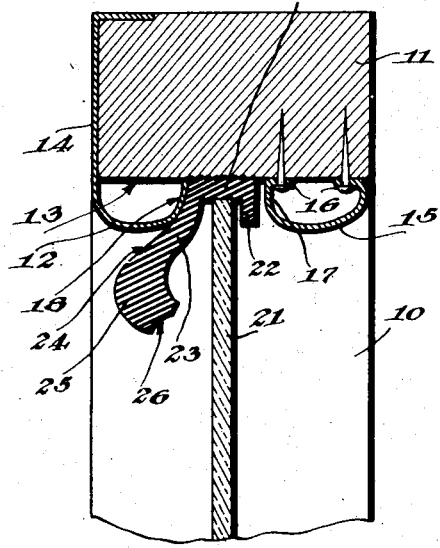
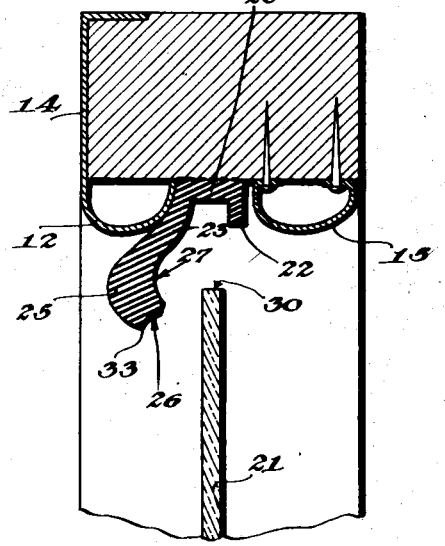
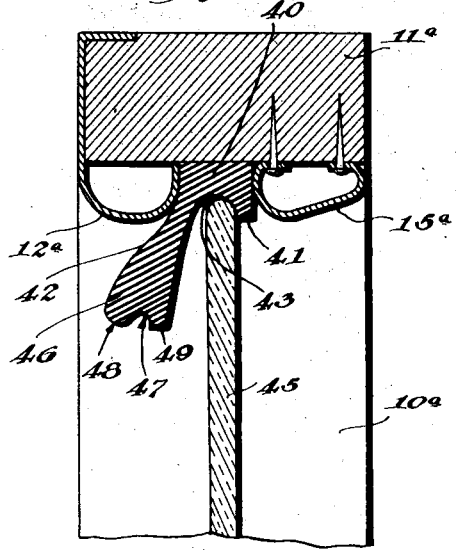
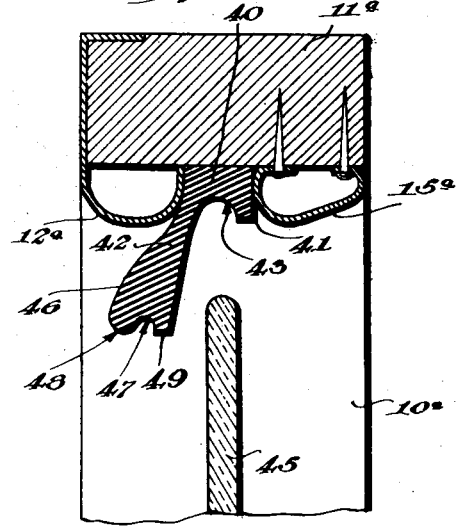
INVENTOR
J. S. White,
BY
ATTORNEY Patented Apr. 2, 1929.

1,707,888

UNITED STATES PATENT OFFICE.

JOHN STEVEN WHITE, OF PADUCAH, KENTUCKY, ASSIGNOR OF ONE-THIRD TO RALPH R. RUSSELL, OF NAVARRE, OHIO, AND ONE-THIRD TO FRANK R. RIEKE, OF PADUCAH, KENTUCKY.

VENTILATOR.

Application filed April 30, 1928. Serial No. 274,120.

This invention relates to a device for ventilating closed cars or rooms.

An object of the invention is the provision of a shield adapted to be connected to or formed integrally with a buffer for the upper end of a sliding sash, which is employed as a closure for an opening to a building or to a closed vehicle, to provide for the ventilation of the enclosed space, while preventing rain from entering the space.

Another object of the invention is the provision of a buffer formed of rubber or some composition material having moisture proof qualities which depends from said buffer and having a pendant member disposed exteriorly of a movable window and adjacent the upper edge to provide for ventilation of an enclosed space while preventing rain from being forced into the space either by air currents or by capillary attraction.

A further object of the invention is the provision of a buffer formed of some suitable waterproof material and of channel shape with one flange of the channel member being extended downwardly and spaced from the upper free end of a movable pane of glass forming a closure for an opening in the door of a vehicle or for an opening in the walls of a room, the extended flange being spaced sufficiently from the movable end of the glass to provide for the ventilation of the vehicle or room when the glass is lowered, while preventing moisture being directly transmitted to the enclosure, the free end of the extended flange including means for preventing moisture from traveling around the surface of the flange.

This invention will be best understood from a consideration of the following detailed description, in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a vertical section of a window showing my invention applied thereto and disclosing the transparent closure in an operative position, Figure 2 is a similar vertical section showing the transparent closure in open position, Figure 3 is a vertical section of a modified form of the invention, and Figure 4 is a similar section to that shown in Fig. 3, disclosing the transparent closure in open position.

Referring more particularly to the drawings, 10 designates a side bar of the frame of a door of a vehicle, to which is secured in any approved manner an upper transverse bar 11. A metal bead 12 of channel shape is secured to the under face 13 of the bar 11 and has the outer flange extended upwardly, as shown at 14, and secured to the outer face of the bar 11. The bead 12 is of the usual type found in automobile bodies of the closed car type.

A second bead 15 of standard construction has inturned flanges 16 secured to the outer face 13 of the bar 11 and has its outer flange, shown at 17, spaced from the inner flange 18 of the bead 12.

The channel shaped buffer strip 20 is secured in any approved manner to the under face of the bar 11 and is neatly fitted between the outer flange 17 of the bead 15 and the inner flange 18 of the bead 12, and is adapted to receive the upper end of a transparent closure 21, which is usually formed of glass. A flange 22 of the buffer is of standard width. The second flange 23, however, is specially constructed and is extended downwardly and outwardly with the outer walls, as shown at 24, curved to conform to the curvature of the inner flange 18 of the bead 12. The flange is expanded at 25 adjacent its free end and is provided with a transverse groove in the inner edge for a purpose which will be presently explained. The inner wall of the flange is curved outwardly, as shown at 27, to provide sufficient air space between the outer face of the member 21, and the inner face of the flange. It will also be noted that the inner face of the flange 23 is spaced throughout its width from the outer face of the transparent closure 21.

The operation of the device shown in Figs. 1 and 2 is as follows: When it is desired to ventilate a closed vehicle, the glass 21 is lowered by the usual crank, rack, and gear arrangement, or by any well known means until the upper free edge 30 of the closure reaches a point slightly above the free end of the flange 23. It will be noted that due to the curvature of the flange 23 and the spacing of the flange from the member 21, that a comparatively wide air passage is provided over the top of the member 21. However, the free edge 30 of the member 21 is retained sufficiently above the lower free edge of the flange 23 in order to prevent rain from being forced into the closed vehicle or room. Furthermore, the flange is spaced sufficiently from the member 21 in order to eliminate the collection of moisture between the inner face 27 of the flange 23, and the outer face of the member 21, which would ordinarily be forced into the closed vehicle under pressure of the air currents.

It will be noted that the free edge of the flange 23 is provided with a longitudinal groove 26 furnishing a sharp, straight edge 33 which will cause moisture collecting on the outer face of the flange to be discharged at this point, thereby preventing the moisture from being carried around the inner face of the flange and into the space within the vehicle.

Referring more particularly to Figs. 3 and 4, it will be seen that similar beads 12ᵃ and 15ᵃ are secured to the under face of the bar 11ᵃ to provide a longitudinal groove to receive a buffer 40. This buffer has a short flange 41 and an extended flange 42. Between the flanges a groove 43 is formed to receive the upper free end of a pane of glass 45 which is adapted to be moved into an open or closed position in a well known manner. The lower free end of the flange 42 is thickened throughout its length, as shown at 46. The free edge is also provided with a groove 47 extending the length thereof to prevent water from traveling around the outer surface to the inner surface, and which would ordinarily be driven into the space within the vehicle by the air currents during the ventilation of the space. The groove 47 thereby provides a pair of ribs 48 and 49 which cooperate with the groove to prevent moisture from passing to the inner surface of the flange 42.

The transparent closure 45 has the side walls supported in any approved manner by the side bars 10ᵃ of the door frame of the vehicle.

The operation of the device shown in Figs. 3 and 4 is similar in all respects to that shown in Figs. 1 and 2. By lowering the transparent closure 45, a space will be provided between the flange 42 and the upper edge of the member 45 to permit the circulation of air, while preventing direct transmission of moisture during rain storms, to the interior of the vehicle.

It will be seen by the use of the member 40 that it will be unnecessary to in any way reorganize or reconstruct any of the usual parts of the closed body of an automobile, since it is only necessary to substitute the buffers 20 and 40 formed according to the present invention for the usual channel shaped buffers now in use, and this may be done before or after the vehicle has been completed. Such buffers, however, may be incorporated in any of the present types of automobiles by substituting the buffer with the extended flange for the buffer now employed.

I claim:—

1. A combined buffer and ventilating device comprising a channel shaped member formed of elastic material and having one flange extended below the edge of the other flange, the flanges being formed integrally with the channel-shaped member.

2. A combined buffer and ventilating device comprising a channel shaped member formed of elastic material and having one flange extended below the edge of the other flange, the extended flange being curved outwardly and formed integrally with the channel-shaped member.

3. A combined buffer and ventilating device comprising a channel shaped member formed of elastic material and having one flange extended below the edge of the other flange, the free edge of the extended flange being provided with a groove, the flanges being formed integrally with the channel shaped member.

4. A combined buffer and ventilating device comprising a channel shaped member having one flange extended below the edge of the other flange, the extended flange being curved outwardly and then inwardly.

5. A combined buffer and ventilating device comprising a channel shaped member having one flange extended below the edge of the other flange, the extended flange being curved outwardly and then inwardly, the free edge of the extended flange being provided with a groove.

6. In a window construction, a frame, a closure slidable in the frame, a buffer of channel shape formation formed of elastic material and adapted to receive the free end of the closure, one flange of the buffer being extended to provide a baffle spaced from the free end of the closure, the baffle being formed integrally with the buffer.

7. In a window construction, a frame, a closure slidable in the frame, a buffer of channel shape formation formed of elastic material and adapted to receive the free end of the closure, one flange of the buffer being extended to provide a baffle spaced from the free end of the closure, the free edge of the baffle having a groove extending longitudinally thereof, said buffer being formed integrally.

8. In a window construction, a frame, a closure slidable in the frame, a buffer of channel shape formation adapted to receive the free end of the closure, one flange of the buffer being extended to provide a baffle spaced from the free end of the closure, the baffle being curved outwardly and inwardly.

9. In a window construction, a frame, a closure slidable in the frame, a buffer of channel schape formation adapted to receive the free end of the closure, one flange of the buffer being extended to provide a baffle spaced from the free end of the closure, the baffle being gradually increased in thickness from the buffer to the outer free end.

10. In a window construction, a frame, a closure slidable in the frame, a buffer of channel shape formation adapted to receive the free end of the closure, one flange of the buffer being extended to provide a baffle spaced from the free end of the closure, the baffle being gradually increased in thickness from the buffer to the outer free end, the free edge of the thickened portion being provided with a groove.

Signed at Paducah, in the county of McCracken and State of Kentucky, this 24th day of April A. D. 1928.

JOHN STEVEN WHITE.